March 31, 1931.   H. H. BAKER   1,798,862

DEHYDRATING COMPOSITION

Filed June 5, 1929

Howard H. Baker, Inventor.

By Emil Kenhart

Attorney.

Witness:
J. J. Oberst.

Patented Mar. 31, 1931

1,798,862

UNITED STATES PATENT OFFICE

HOWARD H. BAKER, OF BUFFALO, NEW YORK

DEHYDRATING COMPOSITION

Application filed June 5, 1929. Serial No. 368,726.

My invention relates to improvements in dehydrating compositions, and to the method of producing the same; the composition being for use in various places and for various purposes, to the end that moisture be absorbed from the surrounding objects or parts and the air maintained in a dry condition, especially when the substance is enclosed within a room or any other compartment.

The primary object of my invention is the production of a cheap and highly efficient dehydrating substance consisting of a hygroscopic halogen salt of a metal, which can be conveniently employed in cellars, vaults, warehouses, stockrooms, poultry houses, and many other places, or which can be conveniently placed within a showcase used for displaying confections, adjacent to store windows for keeping the glass free of moisture, and for many other purposes and for use in numerous other places.

Another object of my invention is the provision of a dehydrating composition, which can be molded in solid form, and which possesses the qualities of attracting moisture from the air or other surrounding objects; the composition also being of a nature to create a mild heat so as to cause the chemical action to be speeded up, which results in the moisture being attracted more readily.

Another object of my invention is the provision of a dehydrating composition, including metallic filings or particles thoroughly mixed with the remaining ingredient or ingredients of the composition.

Another object is the provision of a dehydrating composition, which can be molded into solid form under the novel means herein set out.

A further object of my invention is the production of a dehydrating composition, consisting of a hygroscopic halogen salt of a metal and an absorbent material, such as sawdust or any other inorganic material possessing the qualities of absorbing moisture; the absorbent material serving to retard the dissolving or washing away of the halogen salt by holding the moisture in liquid form in the pores of the composition; thus prolonging the life and usefulness of the composition while aiding in rendering the composition more active in its function of attracting moisture.

A further object of my invention is the production of a dehydrating composition in solid form so that it can be conveniently confined within a container for attracting moisture and depositing the moisture in said container when exposing the composition to the atmospheric air.

A still further object of my invention is the production of a dehydrating unit, comprising calcium chloride or any other hygroscopic halogen salt of metal and metallic particles, with or without sawdust combined therewith, or some other absorbent material.

My invention further has for its object the molding of calcium chloride units into desired shape when mixed with another or other ingredients, by providing a mold or form containing a measured quantity of water, the mold or form being of the selected shape to which the unit is to be molded, in introducing the ingredients of the composition in dry form into the measured quantity of water in the mold or form and puddling or spading such dry material into a plastic consistency, in allowing the moisture to drip therefrom and the composition to dry and harden, and in then removing the hardened and formed composite unit from the mold.

My invention has for its further object, the molding of calcium chloride units into the desired shape when mixed with another or other ingredients, by providing a perforated mold or form and placing the same into an imperforate casing or container preferably corresponding in shape to said mold or form and somewhat larger to receive the latter; in placing a measured quantity of water in said casing and allowing the said water to enter the mold or form through the perforations therein; in introducing the ingredients of the composition in dry form into the measured quantity of water in the mold or form and working the ingredients or allowing the ingredients to take up the water with a view of converting the whole into a plastic consistency; in removing the mold or form from the casing and allowing the moisture to drip therefrom and the composition to dry and harden; and in then applying heat to the perforated mold or form to loosen the unit therefrom.

My invention consists in a dehydrating substance comprising a hygroscopic substance or ingredient and metallic particles intimately mixed, and preferably molded or cast into solid form; but if desired, the ingredients thus included in the dehydrating composition may be retained in loose form for certain uses.

The invention further consists in the novel method of molding the dehydrating substance so as to provide a solid dehydrating unit adapted to be placed within or above a water-retaining receptacle and so positioned as to be fully enclosed in an air-tight manner when not in use.

In the drawings:—

Figure 1:
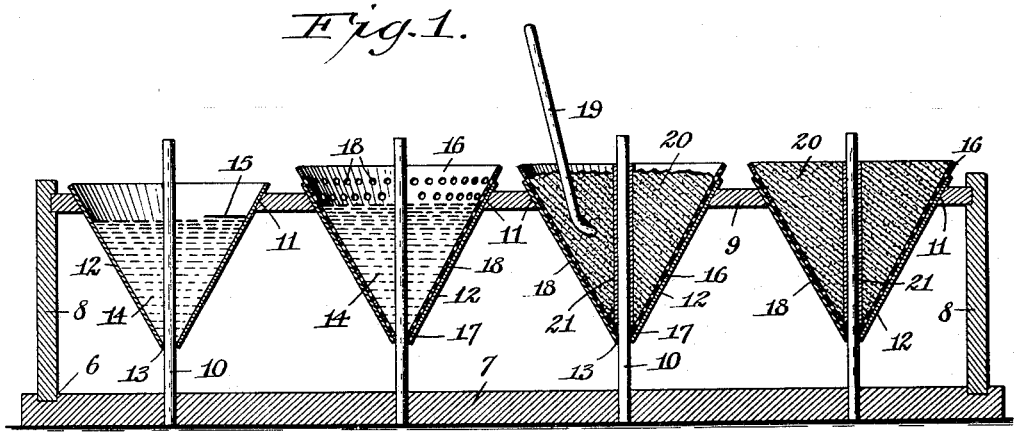
Fig. 1 is a sectional view of an apparatus used to make the dehydrating units, showing the several steps in the method of preparing said units.

The composition essentially consists of calcium chloride or any other hygroscopic salt of a metal, for example magnesium chloride, and in which particles of metal, preferably iron filings are thoroughly mixed in proper proportion. After various experiments I have discovered best results to be obtained with a mixture of ninety-nine parts of calcium chloride to approximately one part of metallic particles, but this proportion may be varied considerably so long as sufficient of the iron particles or filings are employed to create heat, and thus increase the moisture attracting qualities of the product by reason of the accellerated chemical action taking place.

I find it desirable for certain purposes, to mix with the calcium chloride and metallic particles, an absorbent material, preferably sawdust, but any inorganic material of light weight, possessing moisture-absorbing qualities, or of a spongy or porous nature, may be substituted for the sawdust, so long as moisture is attracted thereto by the calcium chloride and held in suspension in liquid form in the pores of said inorganic ingredient; which I find prolongs the life and usefulness of the entire mass or unit, and makes it very active in attracting moisture to the unit.

It may here be stated that the use of iron particles will generate a slight degree of heat and increase the moisture-attracting properties of the compound, and it also possesses other advantages, to be hereinafter set out.

The base of the compound is, of course, the hygroscopic substance, for example, calcium chloride; and within this hygroscopic substance or material the absorbent material may be mixed, such as sawdust or some other inorganic substance, preferably porous in nature and possessing the qualities of absorbing moisture, especially when the compound is in molded form; these two ingredients being mixed with the metallic particles or iron filings.

In preparing the units I provide proper water containers and molds, and when the units are to be provided with tubes axially therein, these water containers, or casings as they may be termed, and the molds or forms are placed within a suitable rack or framework 6, one form of which may consist, for example, of a base or bottom board 7, uprights 8, a supporting board 9, and guide pins 10.

The supporting board is maintained in desired spaced relation with reference to the base or bottom board 7 by having is supported at its ends in notches formed in the uprights 8, or otherwise; and this supporting board is provided with downwardly-beveled openings 11 through which the guide pins 10 extend, the lower ends of said guide pins being fastened into or otherwise secured to the base or bottom board 7.

Supported in the openings 11 of the supporting board are water containers or casings 12, and where the dehydrating unit to be formed is to be conical, the casings are preferably conical, and each has an opening 13 at its apex, which is of a size to permit a guide pin 10 to pass therethrough. The walls of the openings at the apex of these containers or casings are adapted to bear against the guide pins so that water, designated by the numeral 14 and placed in the containers or casings, cannot leak out freely. If desired, these openings may be made watertight in any approved manner.

The water is placed within each container or casing 12 up to a definite level, indicated for example by a level mark 15 on the interior of the container or casing; this level determining the exact quantity of water to be used in forming each dehydrating unit, due allowance being made for any seepage at the opening 13, if not absolutely water-tight. The guide pin 10, aided by the beveled wall of the opening 11 in the supporting board, will centrally position the casing or container so that it is in a balanced vertical position.

After the container or casing is properly positioned and supplied with a predetermined quantity of water, a mold or form 16, conforming in shape to the container or casing and of a size to fit snugly therein, is placed over the guide pin, it having at its apex an opening 17 permitting of this.

The wall of the mold or form is preferably constructed of perforated sheet metal, as shown at 18; thus, when positioned within the container or casing 12, the water will enter the mold or form through said perforations, part of the water being displaced by the wall of the mold or form to bring the same to a slightly higher level. The upper edge of the mold or form extends above the upper edge of the container or casing so that is can be conveniently removed therefrom, and the upper edge of each container or casing extends above the upper surface of the supporting board 9 so that it can be easily removed from the opening in said board.

With the perforated mold or form positioned within the container or casing and water of a definite quantity provided within the mold or form in the manner stated, the ingredients forming my improved dehydrating composition, when dry mixed, are placed into the water within the mold or form. The water is absorbed by the ingredients, or one or more of them, and thoroughly mixed with such ingredients by means of a spatula 19, or otherwise; thus converting the ingredients and water into a plastic mass, indicated for example at 20, Fig. 1. This mass may, of course, be of any height within the mold or form, and when properly mixed to a plastic consistency, it is leveled off. As shown at the extreme right in Fig. 1, the mold or form may be completely filled and leveled off, or the plastic mass may be leveled in a lower plane, if desired.

In the construction of dehydrating units shown, a metallic or other tube 21 is arranged axially within the unit, and this tube may be positioned in place before adding the ingredients of my improved composition to the water, or after the composition is converted into a plastic state. When a tube of this kind is used, it is necessary to make the guide pins of a length so that they extend upwardly through the mold or form, as shown. Where, however, a solid unit is desired without an axial tube, the guide pins may be dispensed with and the apices of the containers or casings and the molds or forms may be closed.

Figure 2:
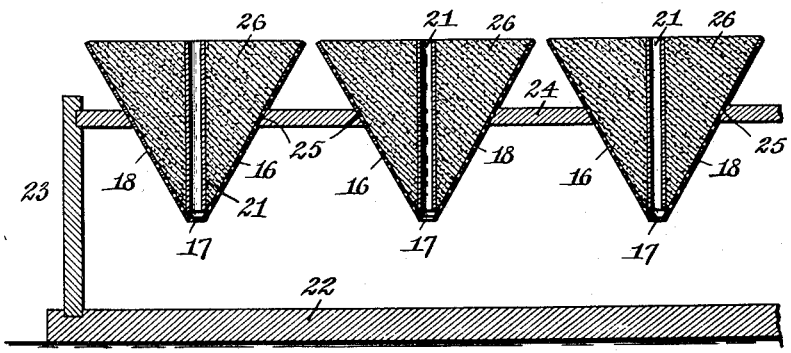
Fig. 2 is a sectional view of an apparatus used to drain, dry, and harden the units.
Figure 3:
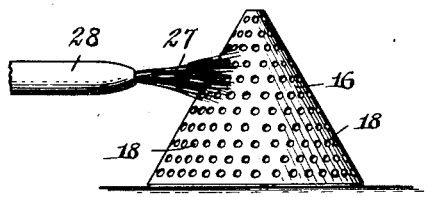
Fig. 3 is a side elevation of a mold or form in which a dehydrating unit is molded, and showing the manner of applying heat thereto to loosen the unit from the mold or form.

After the plastic composition is spread evenly at the top of the molds or forms, the latter are removed from the containers or casings and the molds or forms, with the plastic material therein, placed upon drying racks, such, for example, as shown in Fig. 2, which is similar to the rack or frame 6, in which the units are formed.

Figure 4:
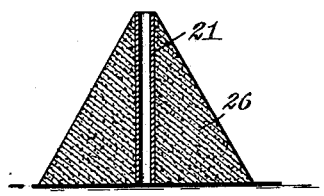
Fig. 4 is a central section through one of the dehydrating units, it being shown with a tube axially therein.

The drying rack comprises a base or bottom board 22, uprights 23, only one of which is shown, and a supporting board 24 having the downwardly-beveled opening 25 therethrough, in which the molds or forms are placed with the wet or plastic composition therein. The moisture from the composition is allowed to drain therefrom through the perforations 18 in the molds or forms, and when dried and hardened, these casings, with their composite units 26 therein, are subjected to the action of a suitable flame 27 from a burner 28, or otherwise heated, so that the composite unit becomes loosened from the metallic mold or form. The heat from the flame, or heat provided under any other method, is applied to all parts of the mold or form, and when loosened and inverted, the mold or form can be removed from the finished unit 26, which will remain upon a table or other support, as shown in Fig. 4. These units may, of course, be constructed in any desired shape or size, and the mold or form may be placed within a water container or casing, regardless of whether or not said mold and casing are of the same formation, so long as the mold can be properly supported within the casing and be provided with the proper quantity of water to assure a proper bondage and mixture of the ingredients without flooding, which would result in the carrying away or liberation of essentials and render the unit less effective in action.

This dehydrating composition may be packed with goods of various kinds to keep them dry, either in storage or transportation, and it is adaptable for use in connection with various food or other commodities and useful wherever it is found desirable to keep surroundings in a dry condition, with the consequent purification of the air at such surroundings.

By the use of the metallic particles within the composition, the material is quicker in action, and due to the heating of the composite mass, increases the hygroscopic qualities of the calcium chloride.

It furthermore tends to form a hardened and somewhat glazed facing or coating on the composite mass, which guards against the accumulated moisture, when trickling downwardly over the surface, from wearing into the mass and consuming it, with the result that the composite mass will retain its form and the life of the same will be prolonged.

While I have specifically set out calcium chloride as the hygroscopic substance or ingredient of my composition, any other hygroscopic substance of a hygroscopic halogen salt of a metal may be used in lieu thereof, under the terms of the following claims, except where the "calcium chloride" is specifically included.

Having thus described my invention, what I claim is:—

1. A dehydrating unit, comprising calcium chloride, sawdust, and iron filings, the whole being mixed together and molded into a solid mass.

2. A dehydrating unit, comprising approximately ninety-nine parts of calcium chloride and one part of metallic particles, such ingredients being thoroughly mixed and molded into a solid mass.

In testimony whereof, I affix my signature.

HOWARD H. BAKER.